US006931355B2

(12) United States Patent
Farrell et al.

(10) Patent No.: US 6,931,355 B2
(45) Date of Patent: Aug. 16, 2005

(54) METHOD AND APPARATUS FOR PROVIDING DATA LOGGING IN A MODULAR DEVICE

(75) Inventors: Michael E. Farrell, Ontario, NY (US); George B. Slack, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/082,149

(22) Filed: Feb. 26, 2002

(65) Prior Publication Data

US 2003/0163275 A1 Aug. 28, 2003

(51) Int. Cl.[7] .......................... G06F 15/00; G03G 15/00
(52) U.S. Cl. ........................................ 702/187; 399/11
(58) Field of Search ............................... 702/187, 127; 358/1.15; 710/8, 15; 347/7, 19, 23, 49, 111; 399/11, 9, 10, 13

(56) References Cited

U.S. PATENT DOCUMENTS

| | | | | |
|---|---|---|---|---|
| 4,062,061 A | * | 12/1977 | Batchelor et al. | 714/47 |
| 4,206,995 A | * | 6/1980 | Legg | 399/11 |
| 4,297,029 A | * | 10/1981 | Carlson | 355/133 |
| 4,335,949 A | * | 6/1982 | Kukucka et al. | 399/11 |
| 5,127,012 A | | 6/1992 | Hiliger | |
| 5,138,376 A | * | 8/1992 | Maruta et al. | 399/9 |
| 5,305,056 A | * | 4/1994 | Salgado et al. | 399/11 |
| 5,490,089 A | * | 2/1996 | Smith et al. | 399/81 |
| 5,617,215 A | | 4/1997 | Webster et al. | |
| 5,646,740 A | * | 7/1997 | Webster et al. | 358/296 |
| 5,982,995 A | * | 11/1999 | Covert et al. | 395/114 |
| 6,003,078 A | | 12/1999 | Kodimer et al. | |
| 6,181,885 B1 | | 1/2001 | Best et al. | |
| 6,580,880 B1 | * | 6/2003 | Regelsberger et al. | 399/31 |
| 6,598,011 B1 | * | 7/2003 | Koritzinsky et al. | 702/185 |
| 6,754,890 B1 | * | 6/2004 | Berry et al. | 717/128 |

FOREIGN PATENT DOCUMENTS

EP  0 843 229 A2  5/1998

OTHER PUBLICATIONS

Mestha et al., A Multilevel Modular Control Architecture for Image Reproduction, Sep. 1–4, 1998, International Conference on Control Applications, pp. 704–709.*
Harmison, Creating Electronic Documents That Interact With Diagnostic Software for On–Site Service, Jun. 1997, IEEE Transaction on Professional Communication, vol. 40, No. 2, pp. 92–101.*

* cited by examiner

*Primary Examiner*—Michael Nghiem
*Assistant Examiner*—Toan M. Le
(74) *Attorney, Agent, or Firm*—Oliff & Berridge, PLC

(57) ABSTRACT

A modular device, that includes an operation event log in respective modules of the device to record time-stamped events, e.g., errors, and a configuration log in a central controller to keep track of changing configurations due to swapping or removal of modules. A controller updates the configuration log each time a module is added to or removed from the device. Log information may be stored locally with the device or in a remote server accessible via a network to facilitate remote diagnostics. To assist in diagnostics, the disclosed method includes merging the configuration and events logs in a way to display log entries according to a selected configuration where errors in current modules are demarcated. The apparatus includes routines in the controller to effect retrieval, processing, and display of demarcated events according to a selected configuration.

15 Claims, 4 Drawing Sheets

METHOD AND APPARATUS FOR PROVIDING DATA LOGGING IN A MODULAR DEVICE

BACKGROUND

The present invention relates to data logging, but more specifically, to a method of and an apparatus for tracking errors and/or other operational events of respective modules of a multi-module device.

An electrophotographic printer or copying machine exemplifies a modular device. Such a device may include several modular, e.g., swappable, components that enable an operator to reconfigure the device in order to meet requirements of a particular job. In many like devices, modularity permits customization or upgrading by adding and/or swapping one or more modules. To assist in maintenance, a multi-modular device often detects and stores information indicative of historical performance information of the respective modules. Such data logs, as they are called, are either examined locally or transmitted to remote diagnostic center to help technicians determine what, if any, corrective or maintenance action should be taken to maintain error-free operation of the device.

A challenge encountered in utilizing logs of multi-modular devices concerns determining whether the data observed truly reflects the device's current performance capability when certain modules thereof may have been replaced, swapped, or removed. Difficulties may arise when an operator reconfigures the device without recordation or notifying subsequent maintenance technicians of the reconfiguration. In addition, storage elements of a module in the device may contain unrelated or useless information as then configured, e.g., stored errors or events may indicate the status of the module when it was part of a different device or a differently configured device. Thus, the presence or absence of certain data in the individual data logs of respective modules of a modular device may complicate diagnosis of problems since the data related to the current configuration may not be easily discerned.

The present invention addresses the above and other problems by, among others, providing a way to obtain, store, combine, and/or decipher respective data logs in a multi-module device.

SUMMARY OF THE INVENTION

In accordance with an aspect of the invention, there is provided a method of providing an integrated error log in an electrophotographic imaging system that includes swappable modules. The method comprises providing and maintaining a configuration log indicative of respective configuration changes in the imaging machine, providing respective error logs for swappable modules of the imaging machine wherein the error logs record errors and a time of occurrence thereof relative to the individual modules and, based on contents of the configuration and error logs, generating an integrated log in a way that demarcates errors according to the current or a selected machine configuration. The method optionally includes providing remote display of the integrated log by, for example, storing the configuration and error logs in a server remote from imaging machine and accessing the server to provide the integrated log.

In accordance with another aspect of the invention, a method implemented in a modular device having interchangeable modules that record operational events relative to the respective modules comprises providing error logs for the respective modules and a configuration log indicative of overall changes in configuration of the modular device, providing an integrated log of events according to a selected configuration by merging the event and configuration logs to produce a combined log, segmenting entries in the combined log according to configuration information, and presenting information according to a selected one of multiple configurations.

In accordance with yet another aspect of the invention, there is provided a modular device capable of interchangeably receiving one or more modules. The modular device comprises a controller that conveys data and control signals with the modules, wherein the modules include a logging service that stores a first set of entries corresponding to service related events. The controller includes a routine that effects monitoring at least one of addition, deletion, and repositioning of the modules and that generates a second set of entries in response to an addition, deletion, or repositioning of the modules. A log viewer accesses the first and second sets of entries to output an integrated log displaying selected operational events according to a given configuration of the modular device. The modular device may further include an I/O interface that enables conveyance of the first and second sets of entries to a server remote from the modular device to facilitate remote diagnostics.

These and other objects of the invention will become apparent upon review of the following description taken in connection with the accompanying drawings. The invention, though, is pointed out with particularity by the appended claims.

DESCRIPTION OF ILLUSTRATIVE EMBODIMENTS

Figure 1:
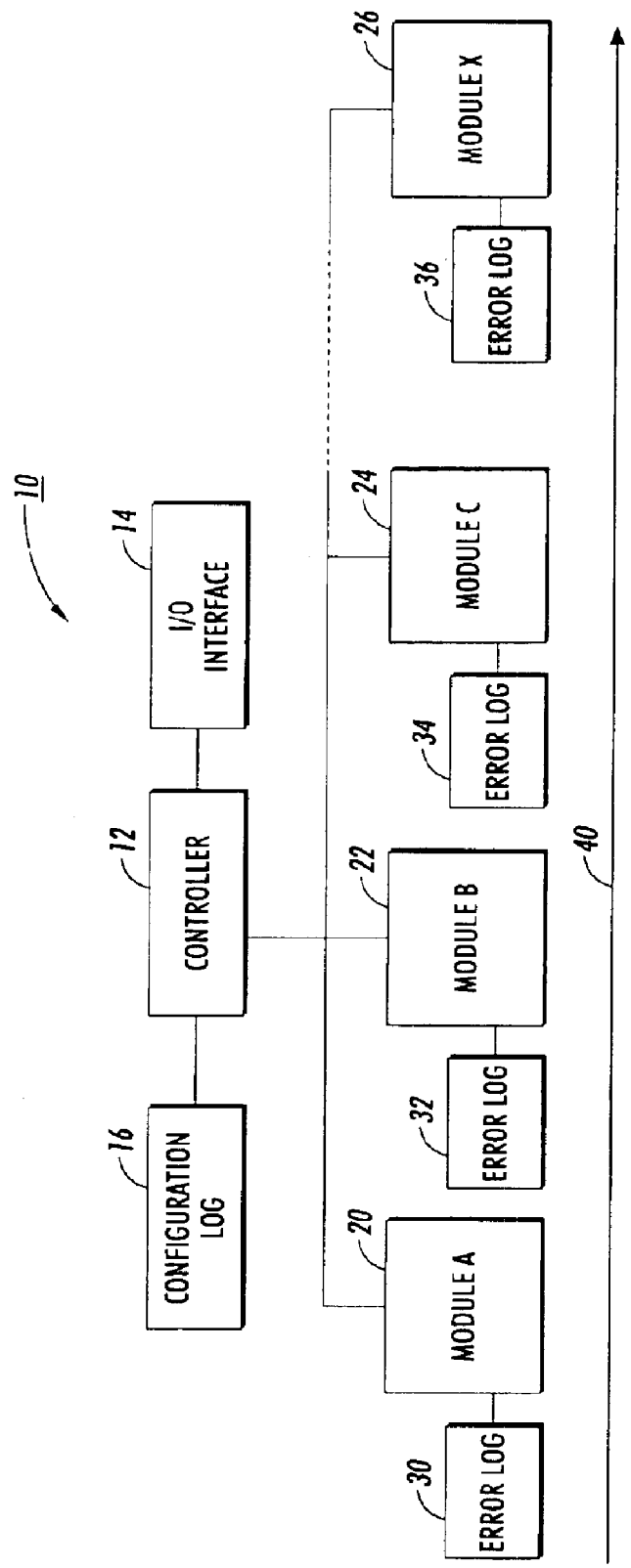
FIG. 1 is a functional block diagram of a modular device in which the present invention may be deployed.

FIG. 1 conceptually depicts a multi-modular device 10 having a main controller 12, an I/O interface 14, and a plurality of interchangeable modules 20, 22, 24 and 26, designated as Modules A, B, C and x, respectively. Interface 14 receives inputs from or displays output for an operator of device 10. To assist in remote diagnostic, interface 14 may also include a modem that enables a connection with and transfer of information with a remote operations center via a telephone or other network. Each of the modules 20–26 preferably includes an associated error or data log 30, 32, 34, and 36 that detects and records information pertaining to at least one operational characteristic or event of the module to which it is connected. The inventive arrangement preferably enables local and/or remote examination of error and operational information of device 10 to assist in trouble-shooting and maintenance. Although shown attached with an associated module, the error logs may be stored or replicated in a server that is local or remote relative device 10.

Advantageously, this reduces service time and manpower required to maintain equipment operation.

In an electrophotographic imaging or similar document reproduction device, for example, the Module A may comprise a document handler/feeder, Module B a finishing station or sorter, and Module C a collating/binding station—each of which perform a task relative to a paper substrate moving along path 40. Device 10 may include any number of Modules x. The principle mother machine to which the modules connect may include a document scanner, image processor, image enhancement processor, scanner system controller, developer station, as commonly known. Further, modules A, B, C, and the mother device may include any number of submodules. If, for example, a document moving along path 40 begins to misalign in Module A or have other feeding malfunctions, Module A transmits a corresponding error code to its data or error log 30, and either controller 12 or Module A time and date stamps the error code. Likewise, error information may stem from misalignment faults in the finisher module, in which case a corresponding error code is recorded in data log 32. A failure of the motor for a rotating polygon of a Raster Output Scanner, malfunction of any of the components associated with a developer unit, exhaustion of paper supply, or a detected mis-alignment of staples or binding media in the finisher are other types of malfunction or service related data which result in an error code being recorded in a respective module or sub-module memory. Controller 12 may periodically poll the modules and sub-modules for error or operational data. Alternatively, controller 12 may receive and record data transmitted from the various modules or sub-modules in real time.

According to an aspect of the present invention, controller 12 also includes a configuration log 16 that records configuration and/or changes in configuration of the device 10. In operation, controller 12 detects the identity of the modules attached to device 10, the arrangement or order of those modules, and a time stamp associated with the arrangement of modules. After such detection, controller 12 stores that information in configuration log 16. In effect, configuration log 16 contains a record of any and all additions, removals, substitutions, reordering, swaps, and/or other reconfigurations of the modules with respect to controller 12 embodied in device 10. Optionally, the controller 12 may transfer a copy of the contents of configuration log 16 to the respective modules so that error or other operational data in a swappable module, whenever or wherever located, may be examined in relation to a history of its configuration with other machines comparable to device 10. Moreover, the configuration log need not be co-located with the controller of the device 10. In a networked environment, for example, configuration information may be transmitted to a local or remote server for subsequent access and processing according to the invention.

In the electrophotographic imaging machine example described above, updating of the configuration log 16 occurs automatically upon addition or removal of a module or sub-module. Updating may occur by the module or sub-module sending in response to a switch-type detector a message along with its ID information to the controller 12 when the module is added or removed, or by the controller 12 periodically or randomly polling the respective modules and sub-modules to detect and record their identification and presence. The various module configurations of device 10 may be consecutively numbered; beginning with a first configuration to established a configuration number that may be recorded with respective entries of error or operational data of the respective modules and submodules.

In the example described above, Modules A, B, C, and x may have been installed in the imaging machine 10 at various times. A first configuration, designated Configuration No. 1, may include only modules A and B. In accordance with an aspect of the invention, where the same module is used in a different position within the machine, the configuration log 16 may reflect a change in module position within the machine. Thus, the designation "Modules A, B" indicates Configuration No. 1 whereas Configuration No. 2 is reflected as "Modules B, A" to indicate that modules A and B were repositioned within the same machine. A more complicated scheme for indicating the position of a particular module within the machine may be employed. Time and date stamping each changes in configuration allows an operator to determine when a module was removed, added, or repositioned within a printing machine.

Figure 2:
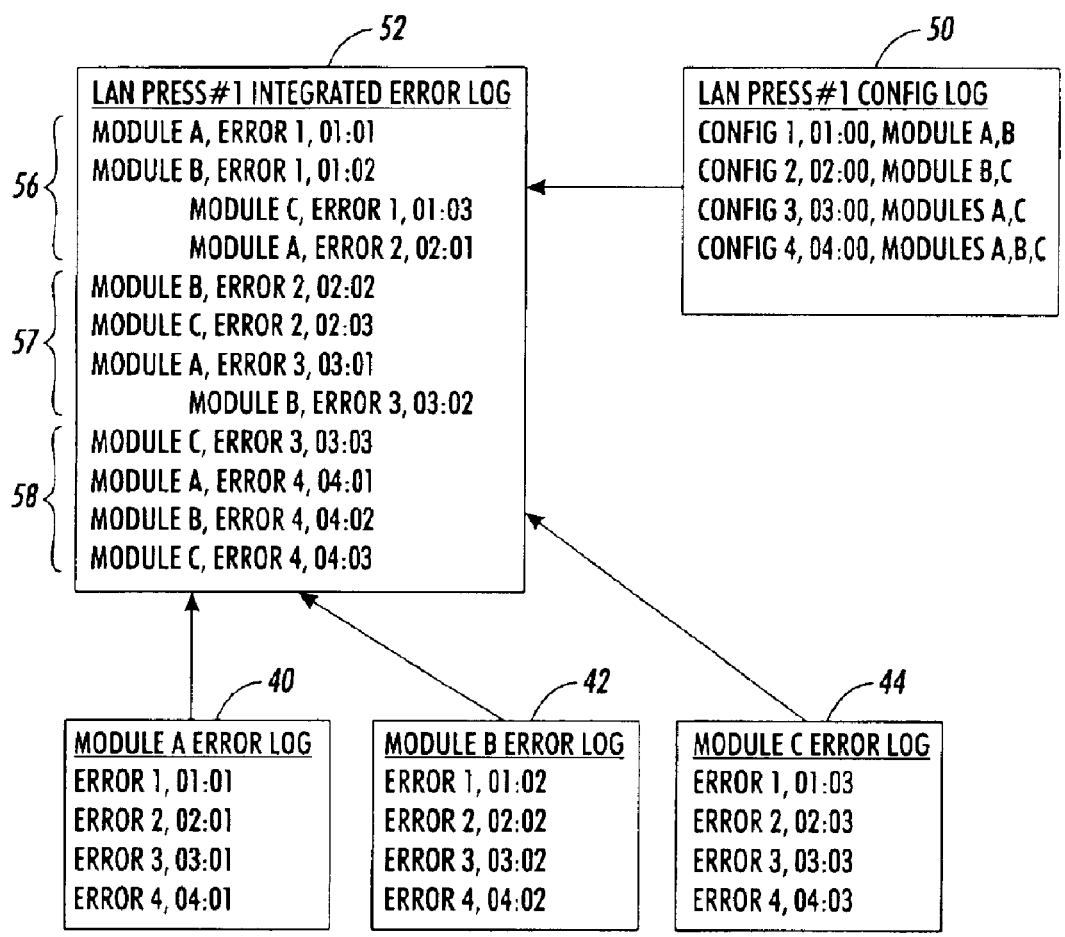
FIG. 2 conceptually illustrates event or error logs of respective modules of FIG. 1, as well as a configuration log and an integrated log in accordance with an aspect of the present invention.

FIG. 2 shows an exemplary format of error log information recorded in respective modules of device 10 and provides a means to track the performance and/or integrity of the respective modules during their successive use in multiple machine environments. Error log 40, for example, depicts error codes and associated run time stamps of operational events in Module A, while error logs 42 and 44 show similar information relative to Modules B and C. For sake of simplicity in explanation, the format of entries recorded in the error logs depicted in FIG. 2 excludes date information, which may additionally be included in the form of actual day, month, and year information. Only three modules are shown here, it being understood that device 10 may contain any number of event logging modules.

Entries in the error logs 40, 42, and 44 identify the type of error that occurred that is specific to modules A, B, and C, respectively, at specific run times. Preferably, each error log module 40, 42, and 44 contains a library of module fault designations for all type of printers or devices with which it may be configured. Entries are recorded contemporaneously with occurrences of errors along with indications of run time, i.e., the amount of time the module has been in service since manufacture, remanufacture, or overhaul. Recordation is accomplished by detecting outputs of a running clock, event counter, and/or sensors embedded at critical points in the module, and detecting/recording their outputs under control of a microprocessor contained in each module, as known in the art.

By way of an example, Error 1 in error log 40 corresponds to a paper jam in a feeder at run time 01:01 (i.e., a paper jam occurring one hour and one minute since manufacture, remanufacture, or overhaul of module A); Error 1 in module 42 corresponds to a detected malfunction of a raster output scanner; and Error 1, 2, and 3 of module 44 indicate notification of required maintenance, low toner, out of paper, respectively. Instead of recording run time, time stamp information may be replaced by an indication of module usage, e.g., a number of documents fed into the module or a number of events performed by the module. Information indicative of a mother machine configuration and/or model designation may also be included with line item entries in the respective error logs 40, 42, and 44. This way, an examination of a respective module independently of the mother machine reveals the environment in which the error occurred—even in the case where the module had been swapped, interchanged, or substituted on multiple occasions.

In accordance with another important aspect of the invention, FIG. 2 also illustrates a configuration log 50 that associates a configuration number with an arrangement of modules, time stamp information, and an integrated error log 52 that uniquely combines error log information from multiple modules in a way to facilitate diagnostics. In the illustrated embodiment, error log 52 selectively displays entries of individual fault logs 40, 42, and 44 according to Configuration No. 4, e.g., Modules A, B, and C, to permit a viewer to easily discriminate among errors that occurred in a current device configuration versus other log entries in the fault logs. While device 10 resided in Configuration No. 4, data group 56 shows that Error 1 occurred in modules A and B at run times 1:01 and 1:02, respectively. Integrated error log 52 also contains line item entries for errors in module C and A at runtimes 1:03 and 2:01, respectively, but these entries are indented (or otherwise marked for delineation, e.g., different color, font, font size, etc.) to convey to the viewer that the recorded line items are not relevant to the Configuration No. 4 analysis.

Likewise, data group 57 shows additional error information for Configuration No. 4 illustrating Error 2 in module B at runtime 02:02, Error 2 in module C at runtime 02:03, and Error 3 in module A at run time 03:01. A single line item entry of Error 3 at runtime 03:02 for module B is indented—indicating its lack of relevance to the analysis of device 10 while residing under Configuration No. 4. Data group 58 illustrates another presentation of integrated errors for Configuration No. 4 for modules A, B, and C.

A technician or operator may initiate compilation and display of integrated error log 52 by making a query at I/O interface 14 (FIG. 1) along with the requested device configuration number. The request may be made locally via a user input, in which case the controller 12 polls the error log modules 40, 42, and 44. Alternatively, a remote request for the integrated error log 52 can initiate polling of the error logs. Remote retrieval may also be made over a local area network (LAN).

Upon receipt of a query from an operator, the controller 12 determines the identity of each module that is part of the current or requested configuration by examining the configuration log 50. Controller 12 also examines the respective logs of the modules to determine the time intervals when that module was part of the requested device configuration by searching the contents of each error log 40, 42, and 44 then connected to device 10. If only two of three devices were then connected to device 10, then information from the third, non-connected module would not be retrieved. In an alternative embodiment, however, each module 20, 22, 24, and 26 may upload the contents of its associated error log 30, 32, 34, and 36 to controller 12 each time it is connected to or removed from device 10 so that information pertaining to operational event lies ready at hand to controller 12.

Figure 3:
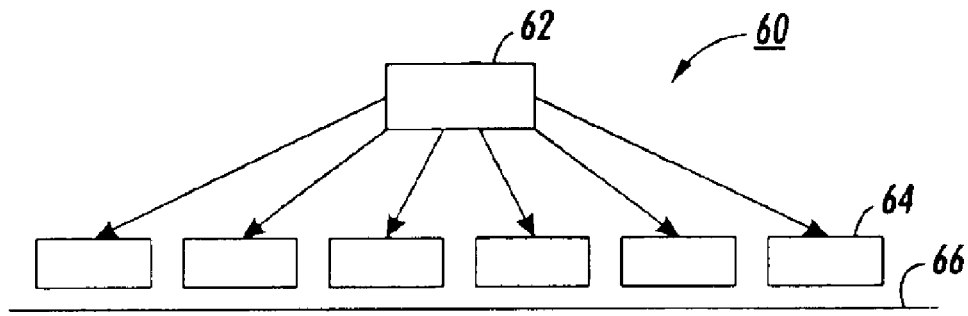
FIG. 3 depicts a generic modular device in which the invention may be deployed.

A modular device in which the invention may be deployed is not limited to the structure shown in FIG. 1. FIG. 3, for example, depicts a generic modular device 60 in which aspects of the invention may be deployed. As shown, device 60 includes a processor or controller 62 that communicates with multiple modules, one of which being depicted as module 64, that perform a task relative to an object that is stationary or that traverses path 66.

Figure 4:
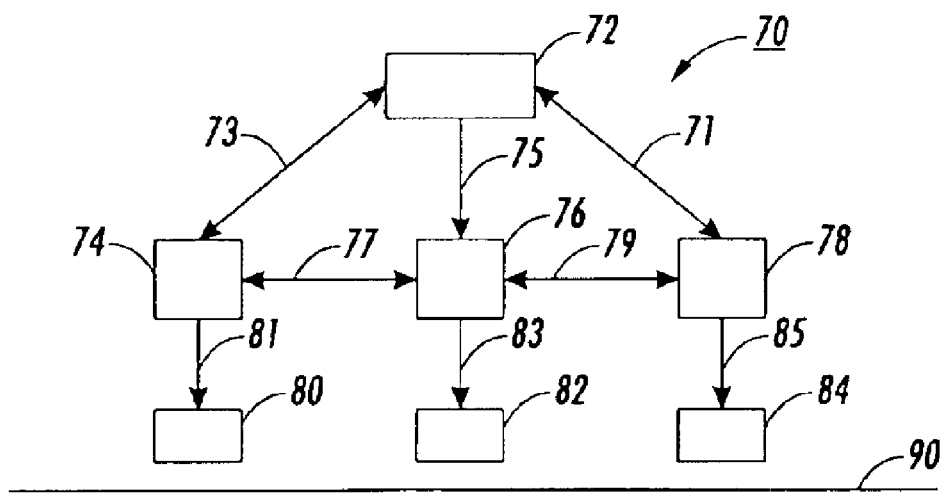
FIG. 4 depicts a second generic modular device in which the invention may be deployed.

FIG. 4 shows another device 70 in which aspects of the invention may be deployed. Device 70 includes a processor or controller 72 that communicates with modules 74, 76, and 78 via paths 71, 73, and 75. In addition, modules 74 communicate with module 76 via path 77, and module 76 communicates with module 78 via path 79 so that the modules themselves may exchange error or operational data relative to each other. This may be helpful for diagnostic or other purposes when a module is examined independently of main processor 72. Sub-modules 80, 82, and 84 communicate with their respective control module 74, 76, and 78 via paths 81, 83, and 85 to perform a task relative to an object that is stationary or that moves along path 90.

Figure 5:
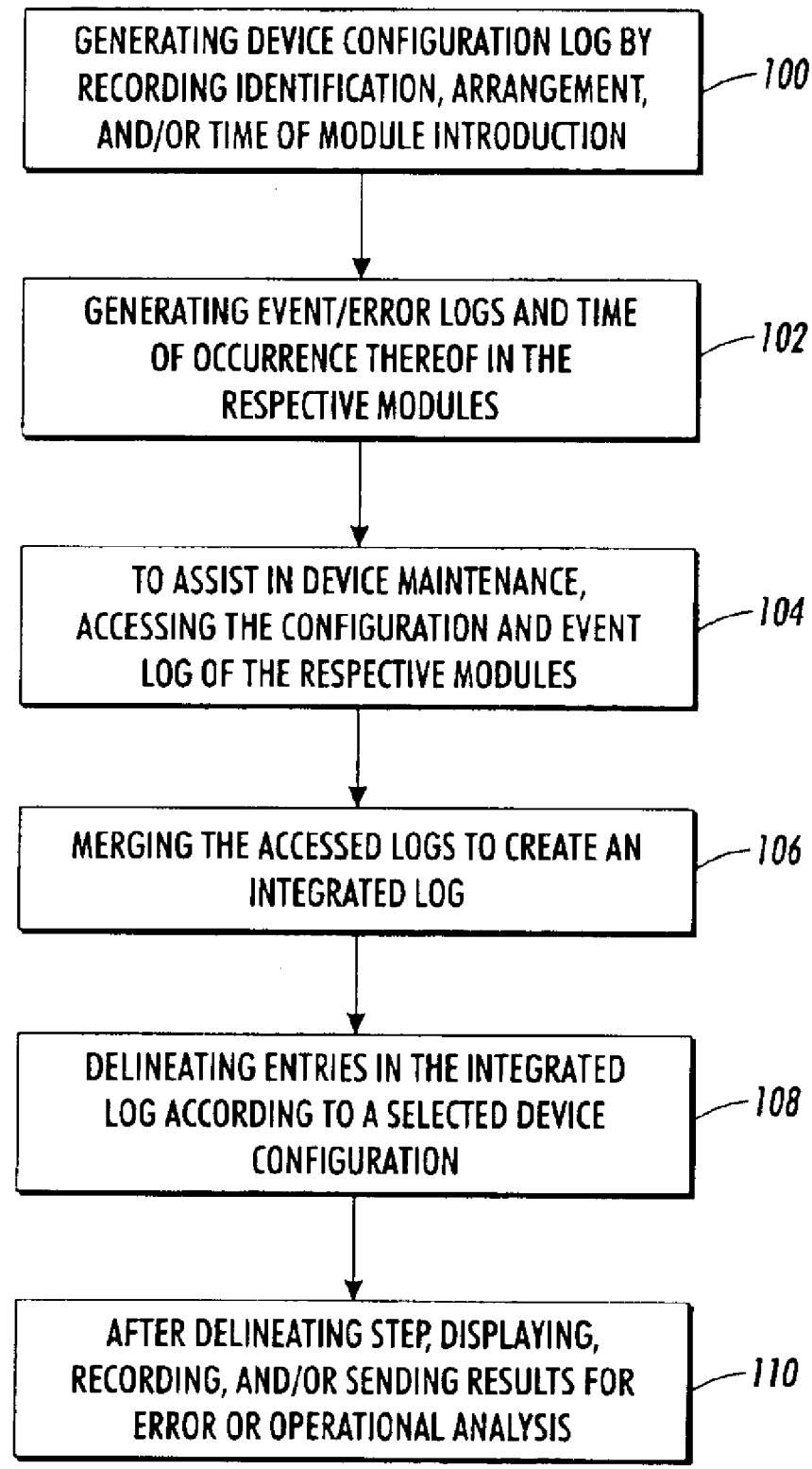
FIG. 5 illustrates a method in accordance with an aspect of the present invention.

FIG. 5 illustrates a method of implementing the invention in a multi-modular device according to another aspect thereof. The illustrated method comprises the steps of generating 100 a device configuration log by recording at least one of module ID, module arrangement or order, and time of introduction or removal of the module with the device configuration, generating 102 an event log indicative of operational events and time of occurrence in the respective modules of the device, accessing 104 the generated event logs of the respective modules, merging 106 the accessed event logs according information recorded in the event and configuration logs to create an integrated master log, delineating 108 entries in the integrated master log according to a selected configuration, and outputting (e.g., displaying, recording in a file, etc.) 110 event information according to a desired configuration. The outputting step may simply comprise displaying text data on a monitor in a form permitting an operator or technician to interpret the results, or recording the output information in a text or database format for subsequent processing, presentation, or display by a custom or conventional log viewing application, e.g., in Excel format. The method may further include sending the integrated master log information to a location remote from the device to assist in remote diagnostics.

The teachings herein enable a person skilled in the art to apply the invention to various methods and apparatuses without departing from the spirit and scope of the invention. As such, it is the intent to include within the scope of the invention all such variation and modifications as may come to those skilled in the art based on the teachings herein. Thus, the present invention is not limited to the embodiments described above.

What is claimed is:

1. In a multi-modular device capable of interchangeably receiving one or more modules having an event log indicative of operational events and an associated time stamp thereof, a method of providing an integrated log for a selected configuration comprising:

generating a configuration log for said modular device that includes entries indicating an identity; of a module and at least one of introduction or removal of a module relative to the device;

merging the event and configuration logs to create an integrated log;

delineating entries in the integrated log according to a selected configuration; and presenting said delineated entries to uniquely identify the entries corresponding to the selected configuration.

2. The method according to claim 1, wherein presenting the delineated entries further comprises providing the delineated entries in a readable format utilizing a log viewing application.

3. The method according to claim 1, wherein the presenting further comprises demarcating selected delineated entries in the integrated log according to the selected configuration.

4. The method according to claim 1, further comprising transmitting the integrated log to a remote server to assist in remote diagnostics.

5. In an electrophotographic imaging system that includes swappable module, a method of providing an integrated event log comprising:

providing and maintaining a configuration log indicative of respective configuration changes in the imaging system;

providing respective error logs and a log of at least one of introduction or removal of the swappable module that record operational events and a time of occurrence of said operational events; and generating said integrated log in a way that demarcates operational events according to a selected configuration based on contents of the configuration log and error logs.

6. The method as recited in claim 5, further comprising providing remote display of said integrated log.

7. The method as recited in claim 5, further comprising storing a representation of said configuration and error logs in a server remote from the imaging system and accessing a server to provide said integrated log.

8. In a modular device having an interchangeable module that includes associated event logs indicative of operational events relative to the module, a method of providing an integrated log of events according to a selected configuration comprising:

providing a configuration log indicative of changing configurations of the modular device;

merging the event and configuration logs to produce a combined log;

segmenting entries in the combined log according to configuration information; and presenting information of operational events according to a selected one of multiple configurations.

9. The method of claim 8, wherein said configuration log includes entries indicative of an addition, removal, or repositioning of said module, said configuration log being stored in a central controller of the device, and wherein compiling said configuration log includes storing a unique code upon each occurrence of said addition, removal, or repositioning of said module within the device.

10. The method of claim 9, including wherein storing the unique code includes time and date stamping of each of said unique code.

11. The method of claim 8, wherein presenting information of operational events associated with the selected one of multiple configuration includes rendering said integrated log into a readable form.

12. A reconfigureable modular device capable of interchangeably receiving one or more modules, said modular device comprising:

a controller that conveys data and control signals with said modules, said modules including a logging service that stores a first set of entries corresponding to service related events;

said controller including a routine that effects monitoring at least one of addition, deletion, and repositioning of the modules and generating a second set of entries in response to at least one of an addition, deletion, or repositioning of said modules; and a log viewer that accesses said first and second sets of entries to output an integrated log displaying selected operational events according to a given configuration of said device.

13. The device of claim 12, wherein the modular device is an electrophotographic imaging machine.

14. The device of claim 13, wherein the imaging machine includes a plurality of modules, each of which include a service event monitor that monitors and transmits service related event codes to said logging service.

15. The device of claim 13, further comprising an I/O interface that enables conveyance of the first and second sets of entries to a server remote from said imaging machine to facility remote diagnostics.

* * * * *